(12) United States Patent
Rastogi (10) Patent No.: US 9,503,242 B2
(45) Date of Patent: Nov. 22, 2016

(54) DEVICE-TO-DEVICE COMMUNICATION MODE (71) Applicant: AMAZON TECHNOLOGIES, INC., Reno, NV (US)

(72) Inventor: Nupur Rastogi, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 282 days.

(21) Appl. No.: 14/209,566

(22) Filed: Mar. 13, 2014

(65) Prior Publication Data

US 2015/0263840 A1 Sep. 17, 2015

(51) Int. Cl.
H04W 4/00 (2009.01)
H04L 5/00 (2006.01)
H04W 76/02 (2009.01)
H04W 72/04 (2009.01)

(52) U.S. Cl.
CPC .......... *H04L 5/0053* (2013.01); *H04W 72/044* (2013.01); *H04W 76/023* (2013.01); *H04W 72/0426* (2013.01)

(58) Field of Classification Search
CPC ....... H04W 72/00; H04L 5/003; H04L 5/003
See application file for complete search history.

(56) References Cited

U.S. PATENT DOCUMENTS

| 2012/0163235 | A1* | 6/2012 | Ho et al. | H04W 76/023 370/254 |
| 2013/0315079 | A1 | 11/2013 | Edge | |
| 2014/0177458 | A1* | 6/2014 | Novak et al. | H04W 72/04 370/252 |
| 2015/0223274 | A1* | 8/2015 | Zhu | H04W 4/206 370/329 |
| 2015/0245350 | A1* | 8/2015 | Webb et al. | H04L 5/0053 370/329 |

FOREIGN PATENT DOCUMENTS

WO WO2012088470 A1 6/2012
WO WO2013189078 A1 12/2013

OTHER PUBLICATIONS

International Search Report and Written Opinion for PCT/US2015/020203, mailed Jul. 2, 2015.

* cited by examiner

*Primary Examiner* — Shaq Taha
(74) *Attorney, Agent, or Firm* — Lowenstein Sandler LLP (57) ABSTRACT Systems and methods for a device-to-device communications mode are described. When two user equipment are within proximity of each other and other requirements are met, the user equipment are configured by their associated nodes to enter a device-to-device communication mode. In that mode, the user equipment receives messages from the other user equipment without the messages traversing the core network between their associated nodes.

19 Claims, 7 Drawing Sheets

DEVICE-TO-DEVICE COMMUNICATION MODE

BACKGROUND

A cellular network includes a number of nodes interconnected by a core network. Each of the nodes defines a cell and can wirelessly communicate with devices within the cell and associated with the node. For a message to be communicated from a first device to a second device, the message may be transmitted from the first device to a first node associated with the first device, from the first node through the core network to a second node associated with the second device, and from the second node to the second device. A reply from the second device may traverse a similar path in reverse, from the second device to the second node, from the second node through the core network to the first node, and from the first node to the first device.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION

As noted above, a cellular network includes a number of nodes interconnected by a core network. The core network is the central part of a telecommunication network that provides various services to users who are connected via the nodes. One of the main functions is to route data, such as user-to-user message data, from one node to another. Each of the nodes defines a cell and can wirelessly communicate with devices within the cell and associated with the node. A device associated with a node is in wireless data communication with a node, but not necessarily in constant wireless data communication. For a message to be communicated from a first device to a second device, the message may be transmitted from the first device to a first node associated with the first device, from the first node through the core network to a second node associated with the second device, and from the second node to the second device. A reply from the second device may traverse a similar path in reverse, from the second device to the second node, from the second node through the core network to the first node, and from the first node to the first device.

Described herein is a method in which two devices communicate with each other directly, bypassing the nodes and the core network, if certain requirements are met. For example, two devices may be configured to communicate with each other directly if they are in close proximity to each other. As a further example, two devices may be configured to communicate with each other directly if legal requirements are met.

Because the message path between the two devices is shorter, communication between the two devices may have improved quality due to fewer hops and reduced possibility of message drop. Further, the amount of traffic on the core network may be reduced. Such direct communication may be particularly useful for local information exchange within an intelligent home or enterprise private network. Direct communication may also be particularly useful between specific devices or devices in specific frequency bands that do not have legal restrictions related to interception of communication at the core network.

Figure 1:
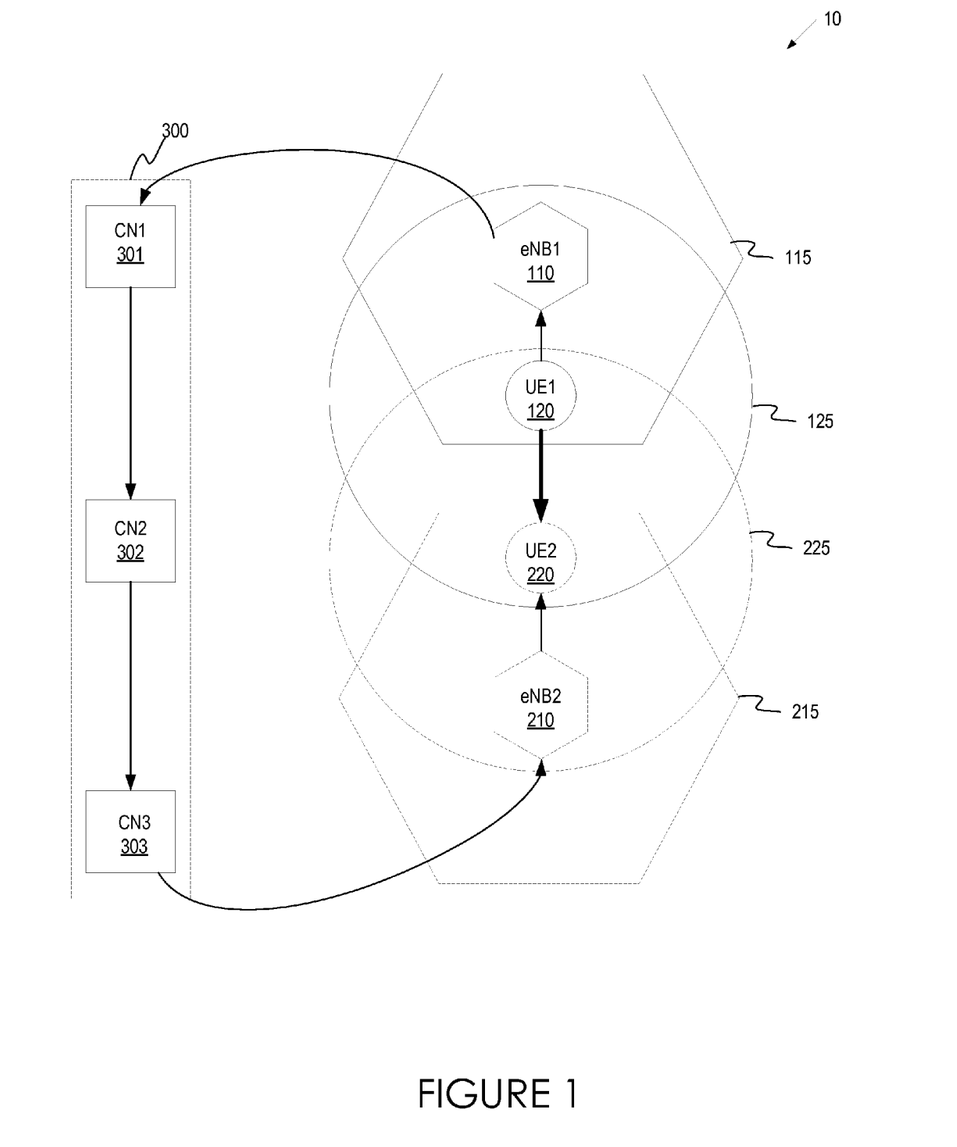
FIG. 1 illustrates an embodiment of cellular network.

FIG. 1 illustrates an embodiment of cellular network 10. The cellular network includes a first eNodeB (eNB1) 110 and a second eNodeB (eNB2) 210 coupled to a core network 300. Although some embodiments described herein refer generally to an LTE (Long Term Evolution) cellular network, it is to be appreciated that other aspects described herein may be used in other networks. For example, aspects described herein may be used in a LAN (local area network) or a PAN (personal area network). Similarly, although terminology specific to LTE or other network standards may be used, it is to be appreciated that aspects may be applicable to other types of networks. For example, aspects described with respect to an eNodeB may be used with respect to a Node B, a base transceiver station (BTS), a base station, a server, a node or other wireless communication hardware with which to communicate with user equipment (UEs) or mobile stations (MSs). The base station may include (1) a transceiver with which to receive wireless signals from user equipment and transmit wireless signals to user equipment and (2) a network interface to communicate with the core network. Thus, the base station couples the user equipment to the cellular network 10.

The eNB1 110 has a communication range defining a first cell 115 and the eNB2 210 has a communication range defining a second cell 215. A first user equipment (UE1) 120 is located within the first cell 115 and able to receive transmissions from the eNB1 110. The UE1 120 has a communication range 125 encompassing the eNB1 110 and thus, the eNB1 110 is able to receive transmissions from the UE1 120. Similarly, a second user equipment (UE2) 220 is located within the second cell 215 and able to receive transmissions from the eNB2 210. The UE2 220 has a communication range 225 encompassing the eNB2 210 and thus, the eNB2 210 is able to receive transmissions from the UE2 220. The UE1 120 and UE2 220 may include any device used directly by an end-user to communicate. For example, the UE1 120 and UE2 220 may be a hand-held telephone, a tablet computer, a laptop computer equipped with a mobile broadband adapter or any other device.

In a normal mode, for the UE1 120 to communicate a message to the UE2 220, the UE1 120 transmits data to the eNB1 110, the eNB1 110 transmits the message through the core network 300 to the eNB2 210, and the eNB2 210 transmits the message to the UE2 220. The core network 300 may include a number of core network components 301-303 including a Mobility Management Entity (MME), a Serving Gateway (SGW), a PDN [Packet Data Network] Gateway (PGW), a Home Subscriber Server (HSS), an IP Multimedia System (IMS), and other network elements. Thus, a message transmitted by the UE1 120 may traverse the eNB1 110, the eNB2 210, and a number of core network components 301-303 before being received by the UE2 220. Additional details regarding the normal mode of communication are described below with respect to FIG. 2.

However, as illustrated in FIG. 1, the UE1 120 and UE2 220 are each within the communication range 125, 225 of the other and could each receive a message transmitted by the other. Thus, in a device-to-device (d2d) mode, the UE1 120 and the UE2 220 communicate directly with each other, bypassing the eNB1 110, the core network 300, and the eNB2 210. This may improve the quality of communication between the UE1 120 and the UE2 220 and reduces the amount of traffic on the core network 300. Additional details regarding the device-to-device (d2d) mode of communication are described below with respect to FIG. 3.

It is to be appreciated that FIG. 1 illustrates a particularly orientation of the UEs at a particularly point in time and that the UEs may be mobile devices that, at other times, may be associated with different eNodeBs, out of communication range of each other, out of communication range of the network, turned off, or otherwise at different locations. In particular, whereas FIG. 1 illustrates the first UE1 120 and the second UE2 220 in proximity of each other, this is not necessarily always the case.

Figure 2:
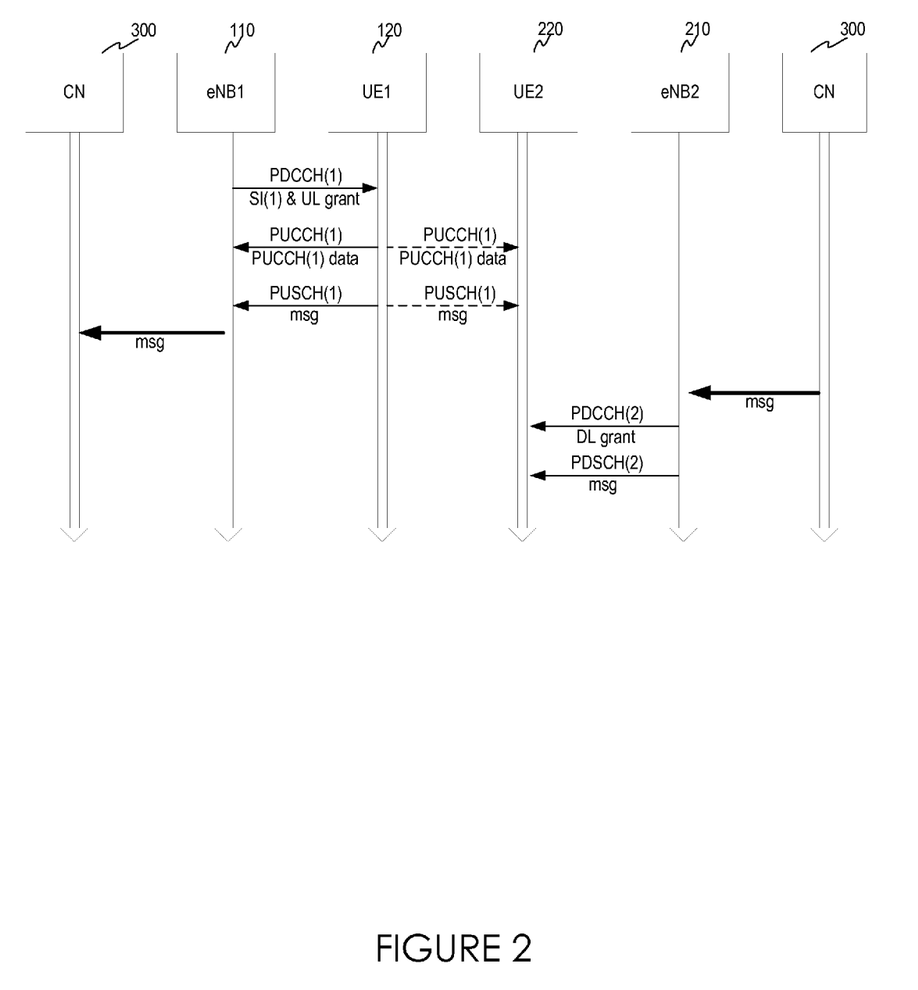
FIG. 2 is a communications timing diagram of a first user equipment (UE1) sending a message to a second user equipment (UE2) in a normal mode.

FIG. 2 is a communications timing diagram of a first user equipment (UE1) 120 sending a message to a second user equipment (UE2) 220 in a normal mode. For the UE1 120 to send a message (or other data) to the UE2 220, the UE1 120 receives an uplink (UL) grant from the eNB1 110 on a downlink control channel. The downlink control channel (along with other channels) may be established during an association procedure between the user equipment and the eNodeB. The downlink control channel may encode control data from the eNodeB to the user equipment. It is to be appreciated that the terms "encode" and "decode" as used herein may include or exclude encryption and decryption, compression and decompression, modulation and demodulation, or other processing.

In one embodiment, the downlink control channel may be a Physical Downlink Control Channel (PDCCH). Thus, the grant may be received on the PDCCH of the eNB1 110 [PDCCH(1)]. Other information may also be received in the PDCCH(1), such as system information of the first node SI(1). Such system information may include a Master Information Block (MIB) and multiple System Information Blocks (SIBs). The system information may indicate a number of antennas of the node, system bandwidth, transmit power, and information regarding channel configuration and scheduling. The system information may include a node identifier, such as a PLMN (Public Land Mobile Network) identifier or a LAI (Local Area Identity). The UL grant provides the UE1 120 with an indication of channel resources to be used by the UE1 120 to transmit the message (and possibly additional messages) to the eNB1 110 on an uplink data channel. The channel resources may be one or more of a time period, a frequency band, a spreading code, a frequency hop pattern, an electromagnetic (EM) polarity, or any other channel resource. A spreading code or a frequency hop pattern may be one of a set of orthogonal waveforms used in spread-spectrum communication systems. Spread-spectrum communication systems also transmission of different data at the same time and at the same frequency using different spreading codes (or frequency hops patterns) and which can still be separated at the receiver. Electromagnetic polarity may be an orientation of the electromagnetic wave. An electromagnetic wave with a single polarity may be referred to as "polarized light." Two electromagnetic waves transmitted at the same time and at the same frequency, but with different, perpendicular polarities, may be separated at the receiver.

The uplink data channel may encode message data from the user equipment to the eNodeB. In one embodiment, the uplink data channel may be a Physical Uplink Shared Channel (PUSCH). Thus, the message may be transmitted on the PUSCH of the UE1 120 [PUSCH(1)] using the resources indicated by the UL grant.

Along with transmitting the message on the PUSCH(1), the UE1 120 transmits control data to the eNB1 110 on an uplink control channel. The uplink control channel may encode control data from the user equipment to the eNodeB. In one embodiment, the uplink control channel may be a Physical Uplink Control Channel (PUCCH). Thus, the control data may be transmitted on a PUCCH of the UE1 120 [PUCCH(1)]. The control data may include, among other things, acknowledgement data such as ACK/NACK of prior received signals and the eNB1 110 may use control data to make future decisions on (re)transmission, channel allocation, etc.

Because the UE2 220 is in proximity of the UE1 120, the UE2 220 may also receive transmissions sent by the UE1 120. However, because the UE2 220 does not have the UL grant information that the UE1 110 was given by the eNB1 110 (or the SI(1))), the UE2 220 does not expect to receive a transmission from UE1 120 or any other source. Thus, the UE2 220 the treats the transmissions as noise and ignores them (as indicated by dashed arrows in FIG. 2).

Once the eNB1 110 decodes the message on the PUSCH (1), the eNB1 110 transmits the message over the core network 300 to the eNB2 210.

The UE2 220 receives a downlink (DL) channel allocation (grant) from the eNB2 210 on a downlink control channel. In one embodiment, the downlink control channel may be a Physical Downlink Control Channel of the eNB2 210 [PDCCH(2)]. The DL grant provides the UE2 220 with an indication of a channel resource to be used by the UE2 220 to receive the message from the eNB2 210 on a downlink data channel. The downlink data channel may encode message data from the eNodeB to the user equipment. In one embodiment, the downlink data channel may be a Physical Downlink Shared Channel (PDSCH). Using the designated channel resource, the eNB2 210 transmits the message to the UE2 220 and the UE2 220 receives it. Thus, the message may be received by the UE2 220 on the PDSCH of the eNB2 210 [PDSCH(2)]). The UE2 220 may use control data received on the PDCCH(2) or from another source to decode the message. Thus, the UE2 220 receives the message originating from the UE1 120.

Figure 3:
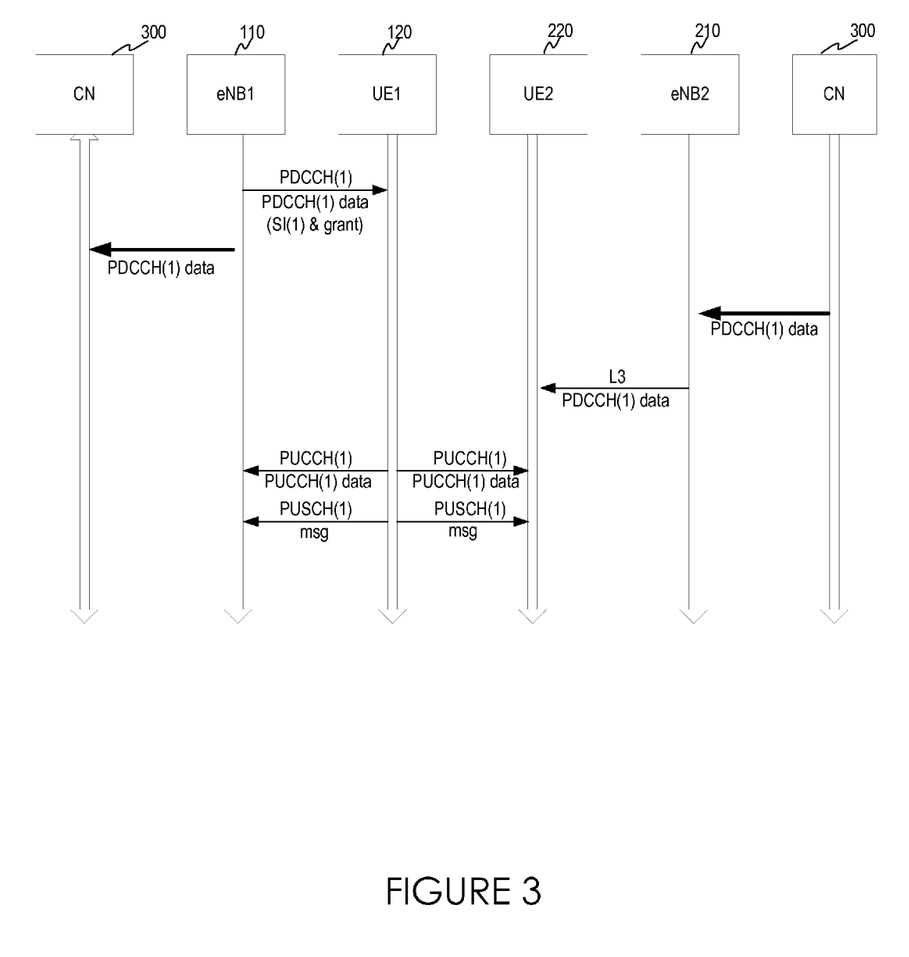
FIG. 3 is a communications timing diagram of a first user equipment (UE1) sending a message to a second user equipment (UE2) in a device-to-device (d2d) mode.

FIG. 3 is a communications timing diagram of a first user equipment (UE1) 120 sending a message to a second user equipment (UE2) 220 in a device-to-device (d2d) mode. For the UE1 120 to send a message (or other data) to the UE2 220, the UE1 120 receives PDCCH(1) data from the eNB1 110 on the PDCCH(1). The PDCCH(1) data may include, among other things, (a) system information of the first node SI(1) and (b) a channel allocation indicating a channel resource to be used by the UE1 120 to transmit the message on the PUSCH(1). The channel allocation may also indicate a channel resource to be used by the UE1 120 to transmit control data on the PUCCH(1). The channel allocation in the PDCCH(1) data may be scrambled by an identifier of the UE1 120, such as the CRNTI (Cell Radio Network Temporary Identifier) of the UE1 120. The PDCCH(1) data may include additional information.

The PDCCH(1) data is also sent by the eNB1 110 over the core network 300 to the eNB2 210 which transmits it to the UE2 220. The information may be transmitted to the UE2 on the PDCCH(2) (or a modified version thereof that includes this information), the PDSCH(2), a dedicated d2d channel, or any other channel. In one embodiment, at least a portion of the PDCCH(1) data is transmitted using Layer 3 (L3) signaling. For example, in one embodiment, the SI(1) of the PDCCH(1) data is transmitted using L3 signaling on the PDSCH(2) while the channel allocation is transmitted on a modified PDCCH(2).

Because the PDCCH(1) data is received by the UE2 220, it is as though the UE2 220 has decoded the PDCCH(1) from the eNB1 110 even though the UE2 220 is not within range of the eNB1 110. Thus, the transmission of the PDCCH(1) data by the eNB2 210 generates a proxy for the eNB1 110.

The UE1 120 transmits the message to the eNB1 110 on the PUSCH(1) using the channel resource specified in the channel allocation of the PDCCH(1) data. As described above with respect to the normal mode, along with transmitting the message on the PUSCH(1), the UE1 120 may transmit uplink control data to the eNB1 110 on the PUCCH (1) including, but not limited to, ACK/NACK of prior signals. As above, because the UE2 220 is in proximity of the UE1 120, the UE2 220 may also receive transmissions sent by the UE1 120. Unlike above, however, the UE2 220 does have the channel allocation that the UE1 110 was given by the eNB1 110 because the UE2 220 has received the PDCCH(1) data from the eNB2 210. Thus, rather than treating the transmissions as noise, the UE2 220 receives and decodes the message transmitted on PUCCH(1) using the PDCCH(1) data (including, e.g., the SI(1) and the channel allocation).

Being in communication range of the UE1 120, the eNB1 110 also receives the message (and any uplink control data). However, in the device-to-device mode, the eNB1 110 does not transmit the message over the core network to the eNB2 210 as in the normal mode. As discussed below, the eNB1 110 may use the uplink control data and message for other purposes (e.g., channel condition feedback and L3 measurement reports), but the eNB1 110 does not send the message over the core network 300. Thus, the UE2 220 receives the message from the UE1 120 without the message being transmitted over the core network 300.

Figure 4:
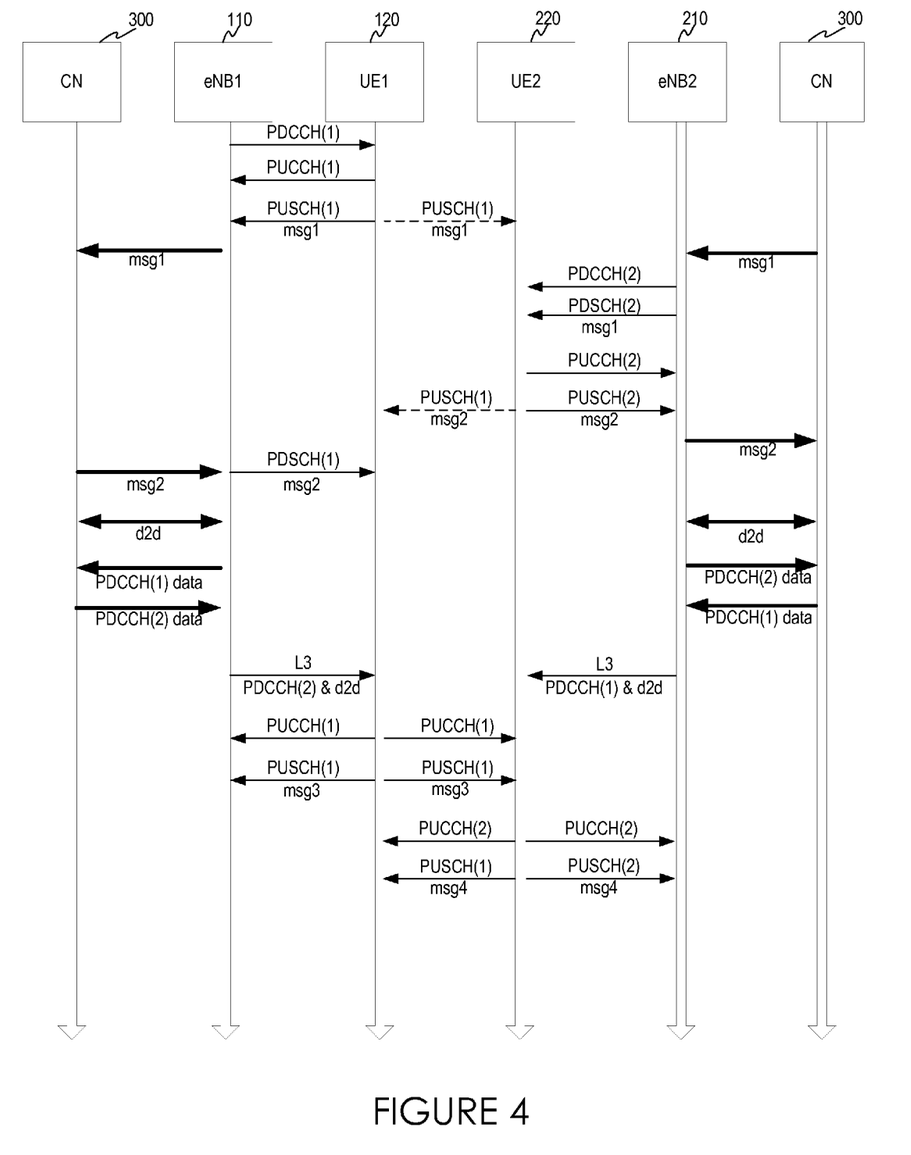
FIG. 4 is a communications timing diagram of two user equipment communicating in a cellular network.

FIG. 4 is a communications timing diagram of two user equipment communicating in a cellular network. Whereas FIG. 2 illustrates a normal mode of communication and FIG. 3 illustrates a device-to-device (d2d) mode of communication, FIG. 4 illustrates switching from a normal mode of communication to a d2d mode of communication. Also, whereas FIG. 2 and FIG. 3 illustrate a message from the UE1 110 to the UE2 210, FIG. 4 illustrates messages in both directions.

The eNB1 110 transmits control data on the PDCCH(1) to the UE1 120 and the UE1 120 transmits control data on the PUCCH(1) to the eNB1 110. The UE2 220 may also receive this transmission, but in normal mode, treats it as noise. The UE1 120 transmits a first message (msg1) intended for the UE2 220 on the PUSCH(1) to the eNB1 110. The msg1 may be transmitted using a channel resource indicated in an UL grant provided by the eNB1 110 on the PDCCH(1). Although the UE2 220 may also receive this transmission, it is treated as noise in the normal mode.

The eNB1 110 sends the msg1 over the core network 300 to the eNB2 210. The eNB2 210 transmits control data on the PDCCH(2) to the UE2 220 and transmits the msg1 to the UE2 220 on the PDSCH(2). The msg1 may be transmitted using a channel resource indicated in a DL grant provided by the eNB2 210 on the PDCCH(2).

To reply, the UE2 220 transmits the reply, a second message (msg2) to the eNB2 210. The msg2 may be transmitted using a channel resource indicated in an UL grant provided by the eNB2 210 on the PDCCH(2). Although the UE1 120 may also receive this transmission, it is treated as noise in the normal mode.

The eNB2 210 sends the msg2 over the core network 300 to the eNB1 110. The eNB1 110 transmits msg2 to the UE1 120 on the PDSCH(1). The msg2 may be transmitted using a channel resource indicated in a DL grant provided by the eNB1 110 on the PDCCH(1).

A decision may be made to switch the two user equipment 120, 220 from the normal mode into a device-to-device (d2d) mode. The decision may be based on a detection that the UE1 120 and the UE2 220 are in proximity of each other. This detection may be based on the geographical location of the user equipment or the APN (access point name) requested by the user equipment or a combination of the two or any other method. The decision to switch the user equipment to the d2d mode may be performed by the core network 300, by the eNodeBs 110, 210, or any other component. The decision may be based on a request transmitted by a user.

Once the decision to switch the devices to d2d mode has been made or communicated to the eNB1 110 and eNB2 210, they may co-ordinate with each other to switch the UE1 120 and UE2 220 into d2d mode. This coordination may include the exchange of messages directly between each other (using, e.g., the X2-AP interface or a proprietary interface) or they may exchange these messages using the CN (using, e.g., the S1-AP interface). As part of these messages they also exchange PDDCH data, including system information (SI(1) and SI(2)), channel allocation information, and other relevant information with each other. The eNodeBs will then send a message to switch their respective user equipment to d2d mode. The same or a different message may also include the duration for which to remain in this mode until otherwise instructed. The same or a different message may also include the PDCCH data of the other eNodeB. This messaging may be done using L3 (RRC) signaling. The time of switching and the duration for which to remain in the d2d mode may be synchronized between the two UEs with the help of their eNodeBs. The actual time/frequency or any other form of physical channel resources may be configured using the PDCCH(1) and PDCCH(2) after the UEs are switched to d2d mode and it shall last for the duration suggested in the RRC signaling message unless other conditions as indicated below are met.

In the d2d mode, the UE1 120 transmits a third message (msg3) on the PUSCH(1) using the channel resource specified in the channel allocation. Because the UE2 220 is in proximity to the UE1 120, the UE2 220 may receive transmissions sent by the UE1 120. Because the UE2 220 has received the PDCCH(1) data from the eNB2 210, the UE2 220 has the channel allocation that the UE1 110 was given by the eNB1 110. Thus, rather than treating the transmission as noise, the UE2 220 receives and decodes the msg3 transmitted on PUCCH(1) using the PDCCH(1) data (including, e.g., the SI(1) and the channel allocation). Thus, the UE2 220 receives the msg3 from the UE1 120 without the message being transmitted over the core network 300.

The UE2 210 may similar reply with a fourth message (msg4) that is not transmitted over the core network 300.

When UE1 120 transmits the msg3, the msg3 is also received by the eNB1 110. Similarly, when UE2 220 transmits the msg4, the msg4 is also received by the eNB2 210. The eNodeBs need not send the information over the CN as in the normal mode of communication, but can still use the received transmission to decode L3 measurement reports.

The L3 measurement reports may be used by the eNodeBs to determine whether to switch out of the d2d mode back into the normal mode. For example, the L3 measurement reports may indicate that one of the user equipment is moving out of coverage of the associated eNodeB and is to be handed over to another eNodeB. If it is determined that the user equipment is to be switched back into normal mode, both user equipment are provided instructions to switch to normal mode and decode the PDSCH of the associated node to receive messages.

The eNodeBs may also decode the ACK/NACK and channel condition feedback of their associated user equipment transmitted on the PUCCH of the associated user equipment. The eNodeBs may use this information to change the uplink channel allocations given the user equipment for device-to-device communication. For example, if the number of NACKs is high or channel conditions unsatisfactory, the uplink channel allocations may be changed. The decision to change the uplink channel allocations may be made by both eNodeBs in conjunction using X2 signaling, proprietary signaling, or other signaling between the two nodes (including or excluding the CN).

The UE1 120 or UE2 220 may implicitly release the channel allocations made to it via PDCCH(1) if it no longer has data to transmit in the uplink, even if the duration of uplink channel allocation configuration as configured by the eNodeB has not expired.

Figure 5:
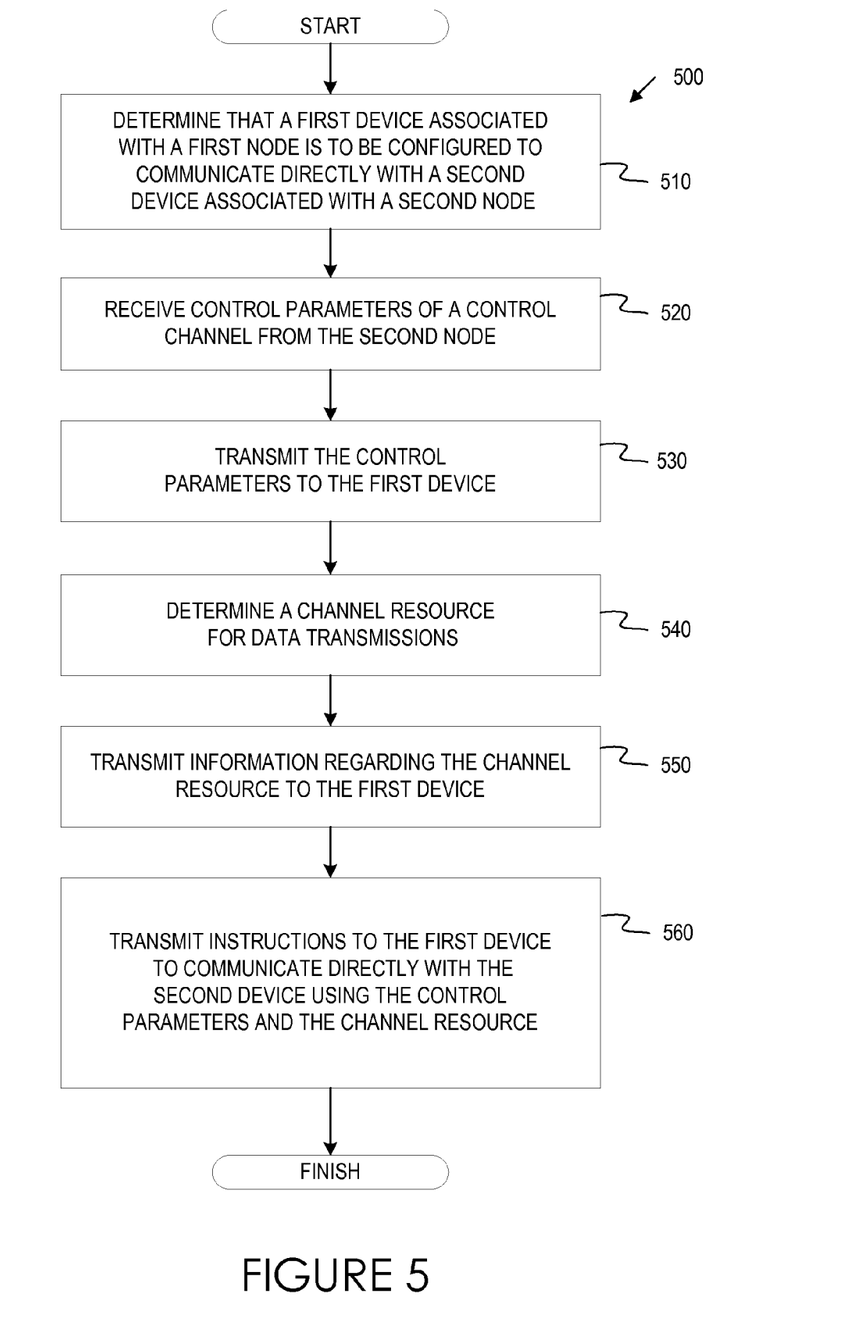
FIG. 5 is a flowchart illustrating an embodiment of a method of configuring a first device to communicate directly with a second device.

FIG. 5 is a flowchart illustrating an embodiment of a method 500 of configuring a first device to communicate directly with a second device. The method 500 may be performed by processing logic that may include hardware (e.g., circuitry, dedicated logic, programmable logic, microcode, etc.), software (e.g., instructions executed by a processing device), firmware or a combination thereof. For example, the method 500 may be performed by the first eNodeB 110 of FIG. 1. Also the flowchart is only suggestive and does not necessarily dictate the order in which the blocks or the functionality within each block have to be executed. The number of messages to be exchanged among the involved entities in order to achieve the suggested functionality is not limited.

At block 510, the processing logic determines that a first device associated with a first node of a network is to be configured to communicate directly with a second device associated with a second node of the network. The processing logic may make this determination in response to receiving a command from a core network. The processing logic may make this determination in conjunction with other processing logic (e.g., processing logic of the second node) using, e.g., L3 signaling between two nodes. In one embodiment, the first device is a first user equipment and the second device is a second user equipment. In one embodiment, the first node is a first base station and the second node is a second base station.

The determination may be based on determining that the first device and the second device are in proximity of each other. It may be determined that the first device and second device are in proximity of each other based on and/or the APN (access point name) requested by the devices and the geographical location of the devices. The first device and second device may be in proximity of each other if the distance between them is less than a threshold, e.g., 100 km, 10 km, 1 km, etc. The determination that the first device is to be configured to communicate directly with the second device may be based on a determination that such configuration satisfies legal requirements, such as LI (Lawful Interception) requirements set forth by the FCC (Federal Communications Commission). The determination may be based on determining a network configuration of the devices. For example, it may be determined to configure the devices to communication directly based on a determination that the devices are part of a single-party sub-network (a contained and defined sub-network owned by a single party), e.g., an intelligent home or enterprise private network.

At block 520, the processing logic receives control parameters of a control channel from the second node. The control parameters may include downlink control channel data of the second node. For example, the processing logic may receive control parameters typically communicated on the PDCCH of the second node. The control parameters may include System Information (SI) of the second node. The control parameters may include a CRNTI (Cell Radio Network Temporary Identifier) of the second device, a PUCCH/PUSCH Resource location allocated to the second device, and other information to decode transmissions of the second device. The control parameters may be received from the second node over an X2 interface, a proprietary interface, or any other interface between the first and second node, including an interface through the core network.

At block 530, the processing logic transmits the control parameters received from the second node to the first device. Thus, the first device receives the control parameters of the second node even though the first device may not be within transmission range of the second node. In particular, the first device receives system information of the second node event though the first device may not be within transmission range of the second node and also receives information regarding channel allocations allocated by the second node even though the first device may not be within transmission range of the second node. The control parameters may be transmitted to the first device using L3 signaling, L1 signaling, other signaling, or some combination thereof.

At block 540, the processing logic determines channel resources to allocate. The channel resources may be one or more of a time period, a frequency band, a spreading code, a frequency hop pattern, an electromagnetic (EM) polarity, or any other channel resource.

At block 550, the processing logic transmits information regarding the allocation of the channel resources to the first device. Information regarding the allocated channel resources may be transmitted on the PDCCH from the first node to the first device. Information regarding the allocated channel resources may also be communicated to the second device. This information regarding the allocated channel resources may also be communicated to second device. For example, the information may be sent the second device by the second node on a modified PDCCH. The second node may receive the information over an X2 interface, a proprietary interface or another interface which may or may not include the CN.

Although described as separate transmissions in blocks 530 and 550, it is to be appreciated that the control parameters (including the system information and user equipment identifying) and the information regarding an allocated channel resource may be transmitted at the same time or a different times and may be transmitted over the same channel or over different channels.

At block 560, the processing logic transmits instructions to the first device to communicate directly with the second device using the allocated channel resources. The instructions may be transmitted using L3 signaling, L1 signaling, or a combination thereof. The instructions include instructions for the first device to determine message data transmitted by the second device.

If the user equipment does not use all of the allocated channel resources the processing logic may receive a release of the grant or a portion thereof. For example, if there is no message data transmitted on the PUSCH, the processing logic may receive a release of the grant from the user equipment. Such release may also be communicated to the other eNodeB and other user equipment.

Figure 6:
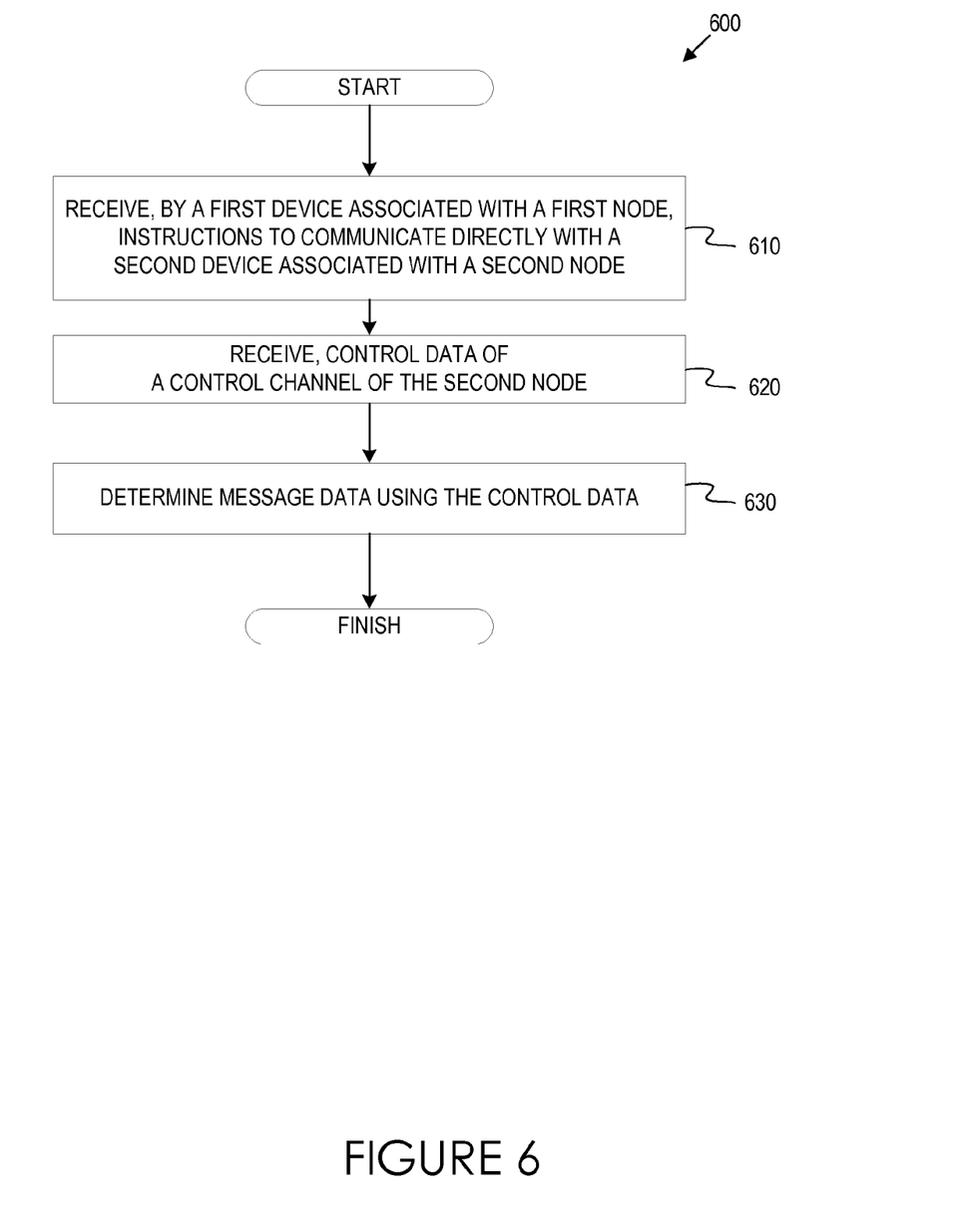
FIG. 6 is a flowchart illustrating an embodiment of a method of a first device directly communicating with a second device.

FIG. 6 is a flowchart illustrating an embodiment of a method 600 of communicating directly by a first device with a second device. The method 600 may be performed by processing logic that may include hardware (e.g., circuitry, dedicated logic, programmable logic, microcode, etc.), software (e.g., instructions executed by a processing device), firmware or a combination thereof. For example, the method 600 may be performed by the first user equipment 120 of FIG. 1. Also the flowchart is only suggestive and does not necessarily dictate the order in which the blocks or the functionality within each block have to be executed. The number of messages to be exchanged among the involved entities in order to achieve the suggested functionality is not defined.

At block 610, the processing logic of a first device associated with a first node receives instructions to communicate directly with a second device associated with a second node.

At block 620, the processing logic receives control parameters of a control channel of the second node. For example, the processing logic may receive information (from the first node or another source) information typically transmitted by the second node on the PDDCH of the second node. The control parameters may include system information and an indication of channel resources to be used in communicating directly with the second device.

At block 630, the processing logic determines message data using the control parameters. For example, the processing logic may receive a transmission from the second device on a PUSCH of the second device. Using the control parameters, the processing logic may decode the PUSCH of the second device and read the message data encoded thereon.

Thus, after receiving the instructions to communicate directly with the second device (at block 610), the first device can receive information typically on the PDCCH of the second node (at block 620), and the PUSCH of the second (at block 630). In contrast, when the device has not received instructions to communicate directly with the second device, the first device receives none of this information. Rather, messages are received on the PDSCH of the first node.

The first device may be instructed by the node to switch back from reading the PUSCH of the second device to reading the PDSCH of the first node (e.g., from the d2d mode to the normal mode of communication).

Figure 7:
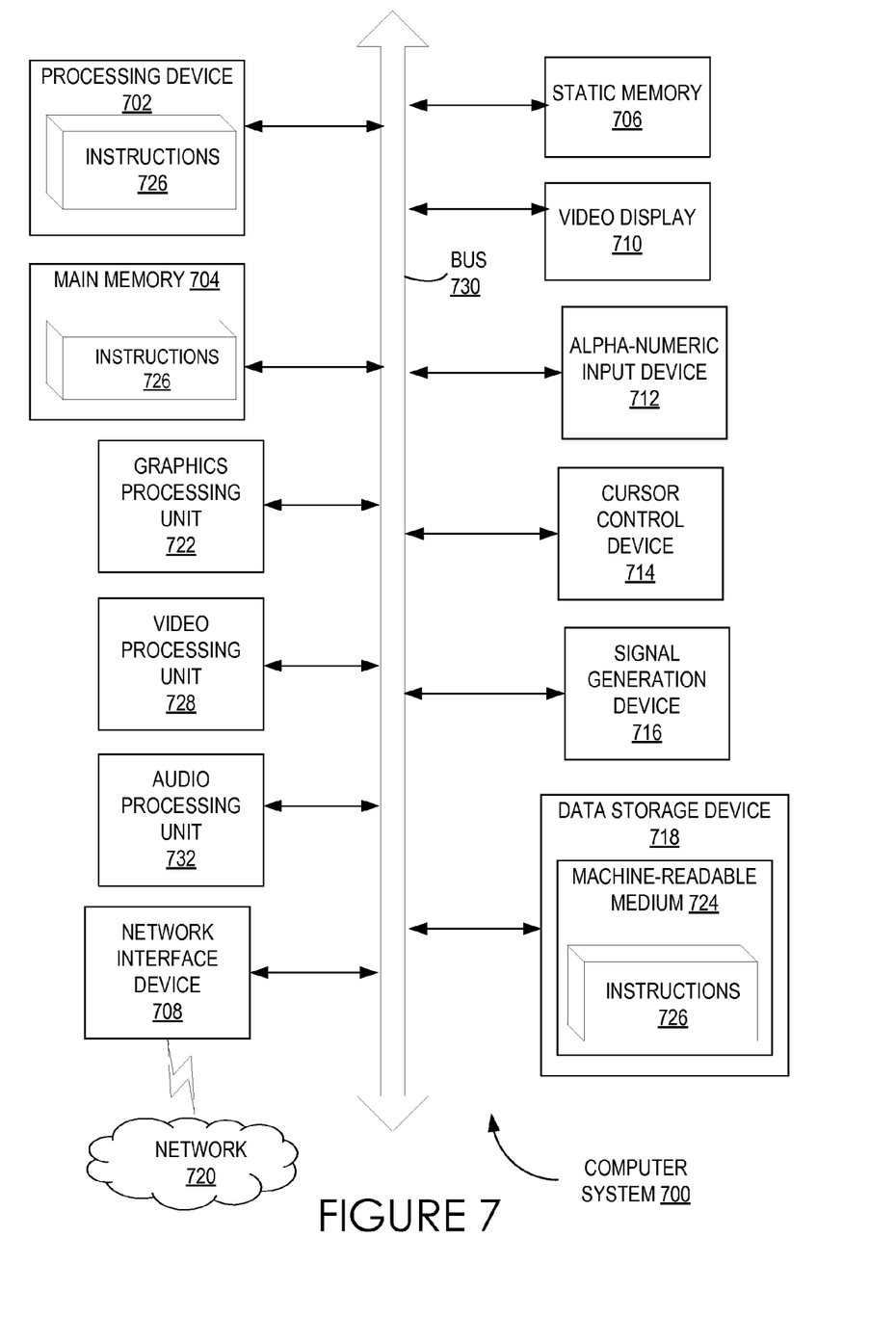
FIG. 7 illustrates a functional block diagram of an exemplary electronic device, in accordance with one embodiment.

FIG. 7 illustrates a diagrammatic representation of a machine in the exemplary form of a computer system 700 within which a set of instructions, for causing the machine to perform any one or more of the methodologies discussed herein, may be executed. The computer system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet or the Internet. The machine may operate in the capacity of a server machine in client-server network environment. The machine may be a personal computer (PC), a set-top box (STB), a server, a network router, switch or bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the computer system 700 may represent the first eNodeB 110, second eNodeB 210, first user equipment 120, second user equipment 220, or any of the core network components 301-303 of FIG. 1.

The computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 718, which communicate with each other via a bus 730.

The processing device 702 represents one or more general-purpose processing devices such as a microprocessor, central processing unit or the like. More particularly, the processing device 702 may be a complex instruction set computing (CISC) microprocessor, reduced instruction set computing (RISC) microprocessor, very long instruction word (VLIW) microprocessor or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker).

The data storage device 718 may include a computer-readable medium 728 on which is stored one or more sets of instructions 722 (e.g., instructions to perform the method 500 of FIG. 5 or the method 600 of FIG. 6) embodying any one or more of the methodologies or functions described herein. The instructions 722 may also reside, completely or at least partially, within the main memory 704 and/or within processing logic 726 of the processing device 702 during execution thereof by the computer system 700, the main memory 704 and the processing device 702 also constituting computer-readable media. The instructions 722 may further be transmitted or received over a network 720 via the network interface device 708.

While the computer-readable storage medium 728 is shown in an exemplary embodiment to be a single medium, the term "computer-readable storage medium" or "computer-readable medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media and magnetic media.

The preceding description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions.

The algorithms and displays presented herein are not inherently related to any particular computer or other apparatus. Various general purpose systems may be used with programs in accordance with the teachings herein or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining, by a first base station, that a first user equipment in wireless data communication with the first base station is to be configured to receive message data directly from a second user equipment in wireless data communication with a second base station without the message data traversing a core network based on a determination by the first base station that the first user equipment is in proximity to the second user equipment;
   receiving, by the first base station from the second base station via the core network, downlink control channel data comprising (a) system information of the second base station, (b) an indication of a communication channel to be used by the first user equipment for receiving message data directly from the second user equipment, wherein the indication of a communication channel comprises at least one of a time and frequency, and (c) an identity of the second user equipment;
   transmitting, by the first base station to the first user equipment, the downlink control channel data; and
   transmitting, by the first base station to the first user equipment, instructions to configure the first user equipment to determine, using the downlink control channel data, the message data transmitted by the second user equipment on an uplink data channel of the second user equipment.

2. The method of claim 1, wherein determining that the first user equipment is to be configured to communicate directly with the second user equipment comprises determining that the first user equipment and second user equipment are part of a single-party sub-network.

3. The method of claim 2, wherein the sub-network is at least one of an intelligent home network or an enterprise private network.

4. The method of claim 1, wherein the identity of the second user device comprises a Cell Radio Network Temporary Identifier (CRNTI) of the second user equipment.

5. A method comprising:
   determining that a first device associated with a first node of a wireless communication network is to communicate one or more messages directly with a second device associated with a second node of the wireless communication network without the one or more messages traversing a core network of the wireless communication network based on a determination by the first node that the first device is in proximity to the second device;

receiving, from the second node, control data comprising system information of the second node, an identity of the second device, and an indication of channel resources to be used for communicating the one or more messages, wherein the indication of the channel resources comprises at least one of a time period and a frequency band;

transmitting, to the first device, the control data;

transmitting, to the first device, instructions to configure the first device to:
receive one or more transmissions from the second device; and
determine, using the control data, message data corresponding to at least one of the one or more messages based on the one or more transmissions.

6. The method of claim 5, wherein the channel resources comprise at least one of a spreading code, a frequency hop pattern or an electromagnetic (EM) polarity.

7. The method of claim 5, wherein the identity of the second device comprises a Cell Radio Network Temporary Identifier (CRNTI) of the second user device.

8. The method of claim 5, wherein the instructions to configure the first device comprise instructions to configure the first device to:
receive a first transmission from the second device;
determine, using the control data, acknowledgment data based on the first transmission;
receive a second transmission from the second device; and
determine, using the control data, the message data based on the second transmission.

9. The method of claim 8, wherein the acknowledgement data is used by the first device to schedule retransmission of at least one of the one or more messages to the second device.

10. The method of claim 8, wherein the control data comprises data from a physical downlink control channel (PDCCH) of the second node, wherein the first transmission is a transmission on a physical uplink control channel (PUCCH) of the second device, and the second transmission is a transmission on a physical uplink shared channel (PUSCH) of the second device.

11. The method of claim 5, wherein the determination that the first device and second device are in proximity to each other is based on a comparison by the first node of a first access point name requested by the first device and a second access point name requested by the second device.

12. The method of claim 5, wherein determining that the first device is to be configured to communicate one or more messages directly with the second device comprises determining that the first device and second device are part of a single-party sub-network.

13. The method of claim 5, wherein determining that the first device is to be configured to communicate one or more messages directly with the second device comprises receiving a command indicating that the first device is to be configured to communicate directly with the second device.

14. A method comprising:
receiving, by a first device associated with a first node of a wireless communication network, instructions to receive one or more messages directly from a second device associated with a second node of the wireless communication network without the one or more messages traversing a core network of the wireless communication network, wherein the instructions are based on a determination by the first node that the first device is in proximity to the second device;

receiving, from the first node, control data comprising system information of the second node, an identity of the second device, and an indication of a channel resource to be used by the first device for receiving message data directly from the device, wherein the indication of a channel resource comprises at least one of a time period and a frequency band;

receiving, from the second device, the one or more messages; and
determining, using the control data, message data corresponding to at least one of the one or more messages.

15. The method of claim 14, wherein receiving the one or more messages comprises receiving the one or more messages using at least a portion of the channel resource.

16. The method of claim 15, wherein the channel resource comprises at least one of a spreading code, a frequency hop pattern or an electromagnetic (EM) polarity.

17. The method of claim 15, wherein the identity of the second device comprises a Cell Radio Network Temporary Identifier (CRNTI) of the second user device.

18. The method of claim 15, further comprising:
receiving, from the second device, one or more acknowledgements of transmissions by the first device; and
determining, using the control data, acknowledgement data based on the one or more acknowledgements to be used for retransmission of at least one of the transmissions by the first device.

19. The method of claim 18, wherein the control data comprises data from a physical downlink control channel (PDCCH) of the second node, wherein the one or more messages are transmissions on a physical uplink control channel (PUCCH) of the second device, and the one or more acknowledgements are transmissions on a physical uplink shared channel (PUSCH) of the second device.

* * * * *